US005994696A

United States Patent [19]

Tai et al.

[11] Patent Number: 5,994,696

[45] Date of Patent: Nov. 30, 1999

[54] MEMS ELECTROSPRAY NOZZLE FOR MASS SPECTROSCOPY

[75] Inventors: Yu-Chong Tai, Pasadena; Amish Desai, Altadena; Terry Lee, San Dimas; Mike Davis, City of Hope, all of Calif.

[73] Assignee: California Institute of Technology, Pasadena, Calif.

[21] Appl. No.: 09/013,961

[22] Filed: Jan. 27, 1998

Related U.S. Application Data

[60] Provisional application No. 60/036,741, Jan. 27, 1997.

[51] Int. Cl.[6] ..................... B01D 59/44

[52] U.S. Cl. ..................... 250/288

[58] Field of Search ..................... 250/288, 281, 250/282, 423 R

[56] References Cited

U.S. PATENT DOCUMENTS 5,541,408 7/1996 Sittler ..................... 250/288

*Primary Examiner*—Kiet T. Nguyen
*Attorney, Agent, or Firm*—Fish & Richardson P.C.

[57] ABSTRACT

An apparatus for MEMS electrospray nozzle for mass spectroscopy formed with top and bottom of SiN, and a between layer of material. The material between the top and bottom forms a filter and also reduces the amount of dead space in the nozzle.

17 Claims, 7 Drawing Sheets

MEMS ELECTROSPRAY NOZZLE FOR MASS SPECTROSCOPY

This application claims benefit under 35 USC 119(e) of the U.S. Provisional Application No. 60/036,741 filed on Jan. 27, 1997, the entirety of which is incorporated herewith by reference.

FIELD OF THE INVENTION

This disclosure relates to chip-based chemical analysis systems such as electrospray mass spectroscopy (MS). More specifically, this disclosure relates to fabrication of a micron-sized micro-electrcmechanical systems ("MEMS") electrospray nozzle.

BACKGROUND AND SUMMARY

Miniaturization of chemical analysis systems has been desirable in fabricating compact liquid chromatographs and capillary electrophoresis chips. The prior art in MEMS technology have been mainly in the field of UV absorbance and electro-chemi-luminescence for on-chip detection. These optical methods are not viable for most biomolecules, e.g. protein and peptide, detection. It is desirable to have an on-chip detection element that has the femtomole sensitivity and versatility provided by a mass spectrometer (MS). MS also allows minimal liquid sample preparation.

Most conventional mass spectrometers are too large to accommodate MEMS systems. Hence, a method and apparatus which couples MEMS systems to a non-MEMS mass spectrometer is desired. More specifically, an on-chip interface that has the advantage of directly connecting the two systems together is desired.

MEMS chemical systems can generate ions for MS analysis with electrospray ionization (ESI). ESI can detect large molecules, e.g. molecules up to 200 KDa, directly from the liquid sample. This capability is desirable for MEMS protein and peptide analysis. Bio-assaLy methods such as polymerase chain reaction (PCR) amplification are not as useful in such a large molecule range. Other advantages of ESI include: soft ionization, ease of use, and complete compatibility with liquid chromatography.

Conventional ESI is done using glass capillaries. If MEMS devices are interfaced using this conventional technique, the liquid sample needs to be piped out with capillary tubing to the MS intake. There, the sample molecules are ionized and then, detected. Dead volume is the internal volume that the liquid takes up from the inlet of the device to the actual point of analysis. The point of analysis in the case of ESI is where the droplets are sprayed out. Smaller dead volume is advantageous. Increase in overall system dead volume can obviate certain advantages gained in MEMS miniaturization of the liquid separation stage. The present disclosure teaches decreasing the overall system dead volume.

The present disclosure provides an apparatus that can couple MEMS systems and mass spectrometry systems using ESI without these drawbacks. Recently, in "Multichannel Microchip Electrospray Mass Spectrometry", Xue et al, Anal. Chem, 1997, vol. 69, p. 426–430 and in "Generating Electrospray from Microchip Devices Using Electrosmotic Pumping", Ramsey et al, Anal. Chem, 1997, vol. 69, p. 1174–1178; Xue et al and Ramsey et al have both tried interfacing flat-edged glass micro-channels with cross-sections of 10 $\mu$m deep by 60 $\mu$m wide to an MS and demonstrating electirospray (ES).

The present disclosure uses an overhanging silicon nitride micro-channel. The preferred dimensions are 1 $\mu$m high by 2 $\mu$m wide. This micro-channel dramatically reduces the wetted surface area at the ESI tip. Reduction of this orifice diameter and tip surface area correspondingly reduces the size of the fluid cone during electrospray, thus reducing the internal volume that the liquid occupies from the inlet of the device to the actual point of analysis. This internal volume is called the dead volume. In addition to reducing dead volume, the nozzle has integrated particle filter structures. These filter structures functions to reduce MEMS ESI tip clogging.

BRIEF DESCRIPTION OF THE DRAWING

These and other aspects will be described with reference to the drawings, in which.

DESCRIPTION OF THE PREFERRED EMBODIMENTS

Micro-electrospray

Electrospray ionization (ESI) generates ions for mass spectroscopic analysis of chemical and biological liquid samples. ESI occurs when fluid in a capillary tip is subjected to a potential drop of e.g. 1–4 kV. The high electric field induces charge on the surface of the fluid at its tip 150. Spraying occurs when coulombic forces are large enough to overcome the surface tension forces.

Figure 1:
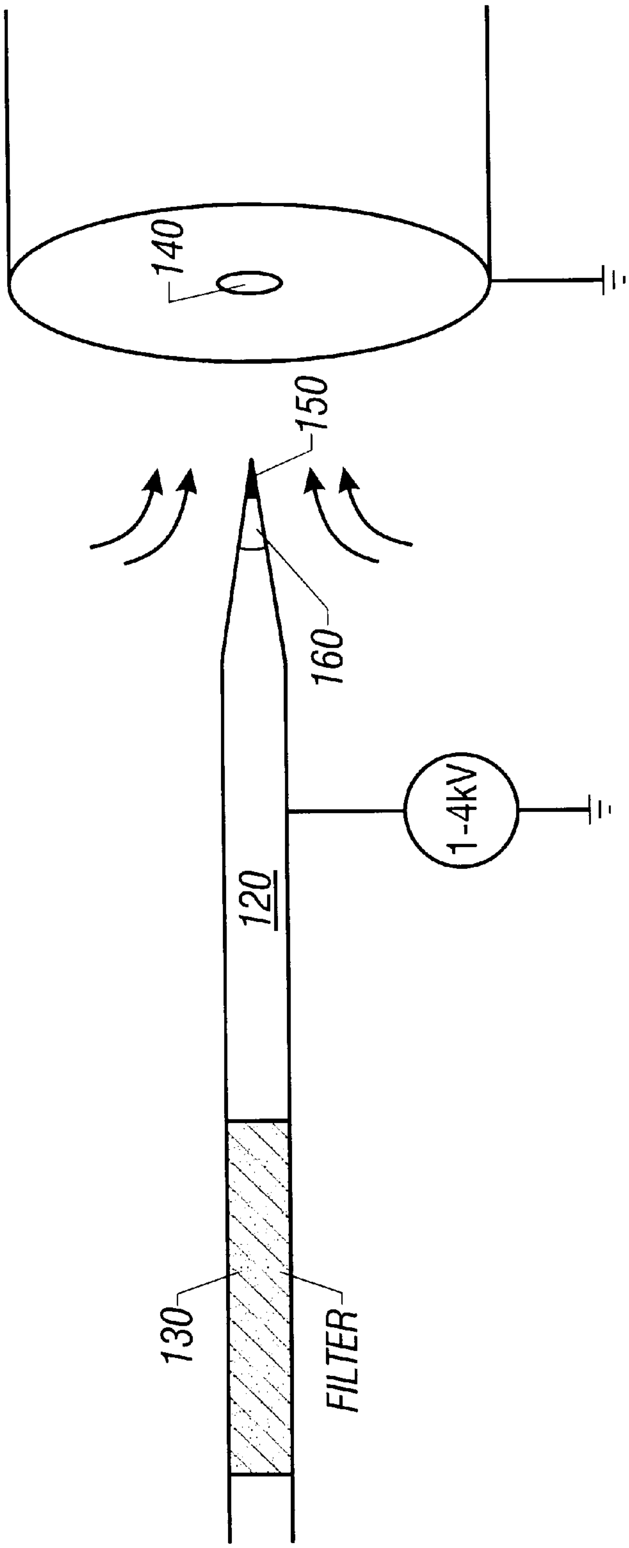
FIG. 1 shows a conventional ESI configuration.

FIG. 1 shows a conventional ESI configuration with a glass capillary 120 packed with particle filters 130 and a MS inlet 140. Particle filters 130 in the system are used to prevent clogging of the tip 150. Conventional capillaries are packed with glass beads to make the filters. Dead volume in this ESI configuration is the volume in the filter 130 plus the volume in the capillary 120 plus the volume of the cone of fluid 160 at the tip 150.

Scaling down the ESI tip from typically 100 $\mu$m to 1 $\mu$m inner diameter (ID) results in significant reduction in dead volume. Dead volume is the proportional to square of the radius. Therefore, the dead volume can be reduced by a factor of approximately $(50)^2/(0.5)^2=10,000$. The outer diameter (OD) minus the inner diameter (ID) is equal to the wall thickness of the capillary. Scaling down the ESI tip reduces dead volume using the minimumn sample required for operation. This produces a more stable electrospray, lower sample flow rates and lower voltages required for ionization.

Figure 2:
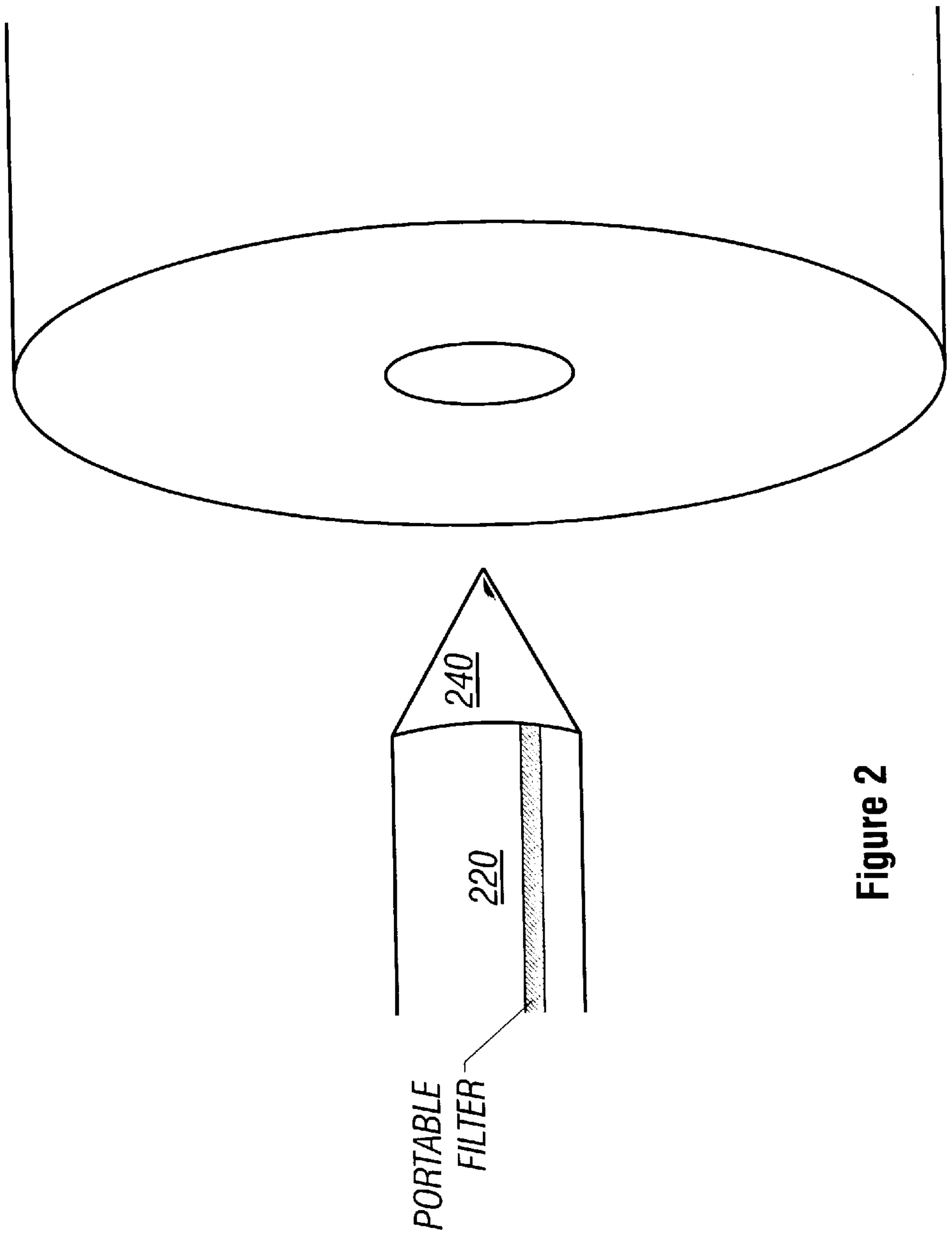
FIG. 2 shows an electrospray from a 370 $\mu$m OD (160 $\mu$m ID) capillary.

FIG. 2 shows an electrospray from a 370 $\mu$m OD (160 $\mu$m ID) capillary. FIG. 2 illustrates the possible savings in dead volume with a smaller electrospray tip. The dead volume is the volume inside the capillary 220 plus the volume of the cone 240. The almost "solid" looking cone of fluid 240 is called the Taylor cone. The Taylor cone is the cone of fluid that is formed when fluid is placed in an electric field for electrospraying. In this embodiment, the flow rate is 1 $\mu$L/min with a potential of 1250 V between the fluid and the MS inlet. This flow rate is within limits of conventional electrospray tips.

In "Electrospray Interface for Liquid Chromatographs and Mass Spectrometers", Wilm et al, Anal Chem, 1985; Wilm et al developed the following mathematical model of this phenomenon:

$$r_e = \left( \frac{\rho}{4\pi^2 \gamma \left[ \left( \frac{U_a}{U_t} \right)^2 - 1 \right] \tan\left( \frac{\pi}{2} - \nu \right)} \right)^{1/3} \cdot (dV/dt)^{2/3}$$

where $r_e$ represents the radius of the emission region at the tip of the Taylor cone, γ the surface tension of the liquid, ρ the density of the liquid, $U_a$ the applied voltage, $U_t$ the voltage at which the cone is formed, ν the cone angle, and dV/dt the flow rate. This equation predicts that the emission radius $r_e$ can be reduced with a reduction in flow rate.

The inventors describe MEMS type nozzles which may be compatible with this theoretical model. In one preferred embodiment a 1:1 water:methanol solution is electrosprayed. The following is a calculation of this embodiment which demonstrates MEMS compatibility with the model. Using the following: $\gamma=0.03531\ Nm^{-1}$, $\rho=896\ kg\ m^{-3}$, $U_a=4000$ V, $U_t=1000$ V, $r_e$ is calculated as 33 nm. It is shown that $r_e$ is much smaller than 1 μm, so MEMS nozzles do conform to the model. If $r_e$ were larger than the normal MEMS sizes, then scaling down the nozzle might not have any benefits.

With this desirable trend toward smaller ESI tips, the conventional way of fabricating these 0–3/1–3 μm inner diameter tips becomes difficult even with a micro-capillary puller. In addition to being time consuming, a major problem of this technique is the inability to produce reproducible tip geometries. Particle filters are inserted manually to prevent the tiny capillaries from clogging with debris.

Many of these problems are obviated by the micromachined electrospray nozzle. The capability to fabricate micron-sized tips with micromachining is advantageous in many ways: 1) the shape and finish of the tip can be reproducible from chip to chip, 2) complex MEMS filter structures can be constructed inside the micromachined liquid channel in order to filter out debris, and 3) mass production is available due to batch processing.

Device Fabrication

Figure 3:
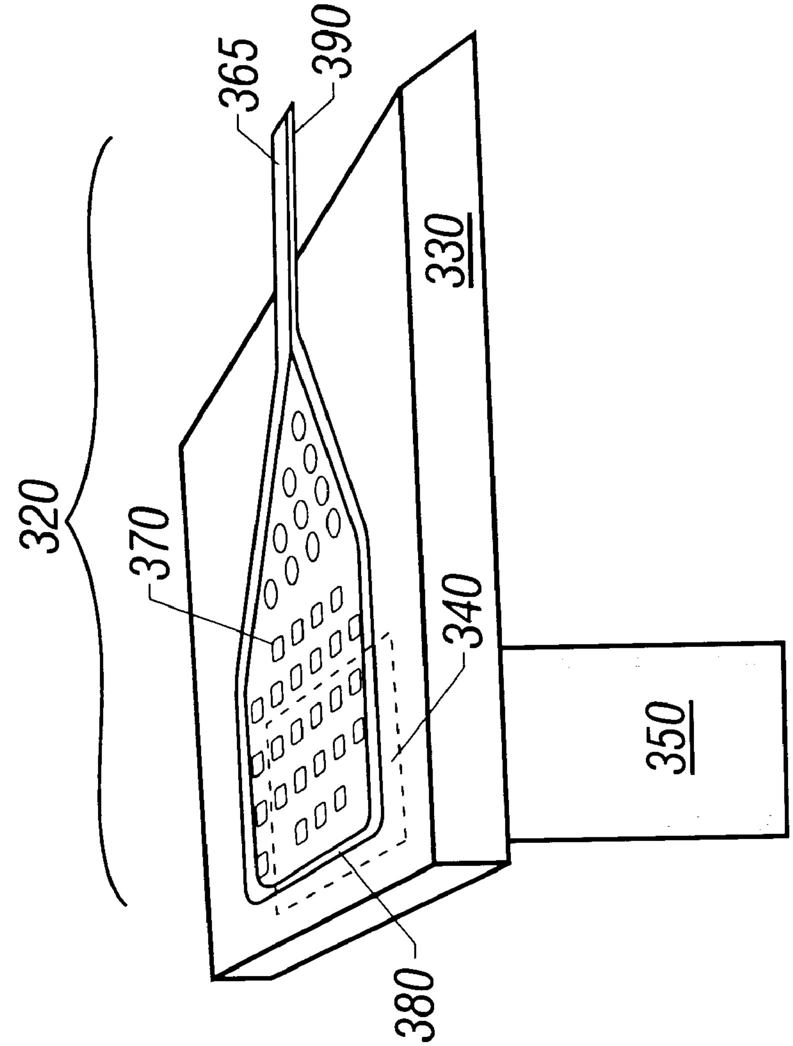
FIG. 3 shows a three dimensional view of an electrospray nozzle.

FIG. 3 shows a silicon micromachined nozzle. The nozzle structure 320 is formed on a support substrate 330, preferably a silicon substrate. The support substrate 330 is formed to have a sample inlet hole 340. The sample inlet hole 340 is positioned on the underside of the silicon substrate 330 in contact with the nozzle structure 320, marked by dashed lines in FIG. 3. A capillary tubing 350 is attached to the sample inlet hole 340 to supply liquid sample into the nozzle structure 320.

Figure 4:
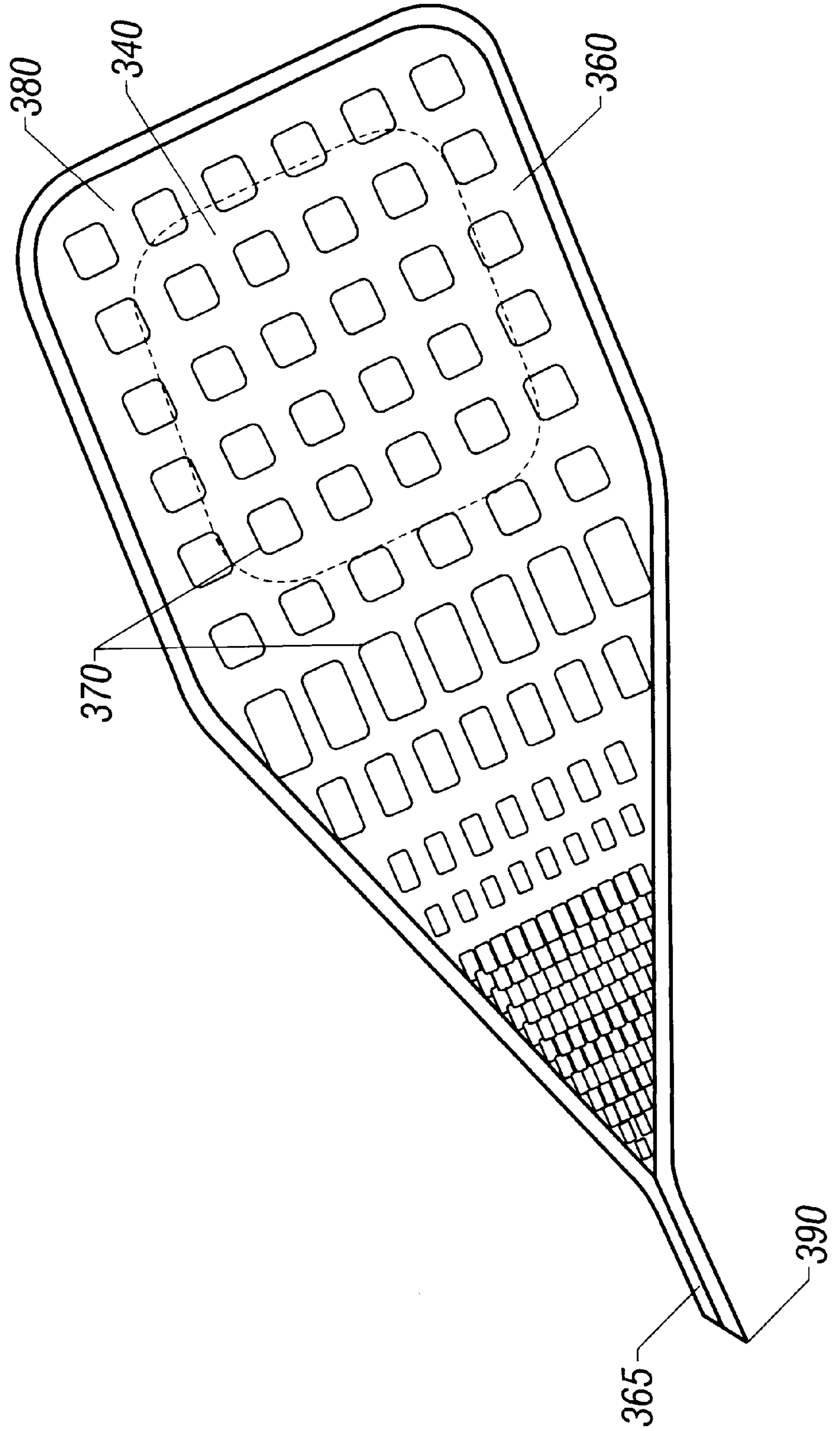
FIG. 4 shows a top view of electrospray nozzle illustrating particle filters.

The liquid sample flows into the channel field 360 of the nozzle structure 320. The channel field 360 is a micro-channel formed with multiple filter structures 370. The channel field 360 narrows into the channel in the tip, tip channel 365. The spacing between the filter structures 370 slowly decreases from the back of the channel field 380 to the tip 390. The filters are closer together as the channel field approach the tip to trap smaller particles from the sample. This spacing scheme functions to prevent nozzle clogging. One embodiment features filter spacing of 30 microns at the back of the channel field 380 and 1 micron filter spacing at the tip 390. 0.5 micron filter spacing at the tip 390 is also preferred. The spacing of the filter structures 370 is shown in detail in FIG. 4. FIG. 4 is a top view of the nozzle structure 320.

Figure 5:
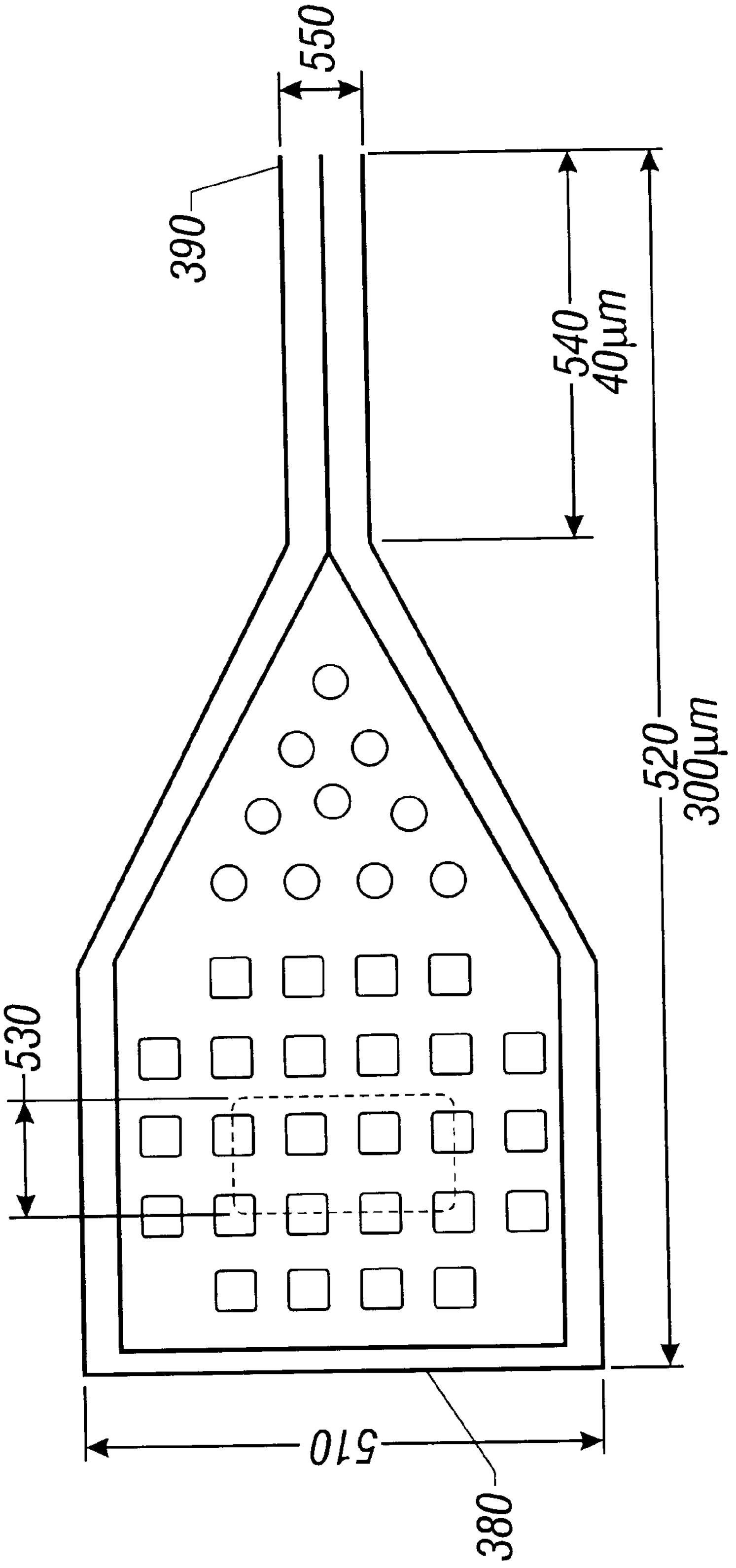
FIG. 5 shows nozzle dimensions in a preferred embodiment.

FIG. 5 illustrates nozzle dimensions in one embodiment. The channel field width 510 at the back of the channel field 380 is 200 μm. The channel field width 510 decreases from the back of the channel field 380 to the tip 390. The total length of the nozzle 520 is 300 μm. The inlet hole width 530 is 25 μm. The length of the tip 540 is 40 μm. The tip width 550 is 3 μm.

FIGS. 6A–6J show the fabrication steps for the nozzle structure 320. FIGS. 6A–6E shows a cross section of the nozzle structure 320 at the interface with the inlet hole 340; the inlet hole 340 is shown as the largest black square on the nozzle structure 320. FIGS. 6F–6J shows a cross section of the corresponding nozzle structures 320 of the FIGS. 6A–6E, respectively at the tip 390.

The nozzle structure 320 is formed by a "sandwich". Two silicon nitride layers 615, 620, each 1 μm thick on a 500 μm silicon substrate 330 form outer portions of the sandwich. A 1 μm phosphosilicate glass (PSG) layer 610 forms both filters and space inhibitors for the interior of the channel. The silicon nitride layers 615, 620, form the channel field 360 and the tip channel 365 after the wafer is back etched with KOH. The channel field 360 is a micro-channel that narrows into the tip channel 365. The first deposited silicon nitride layer 615 is the floor of the channel field 360 and the floor of the tip channel 365. The second deposited silicon nitride layer 620 is the roof of the channel field 360 and the roof of the tip channel 365. The PSG layer 610 acts as the sacrificial layer for the channel field 360 and the tip channel 365. The sacrificial layer is the layer that is deposited and then in subsequent fabrication steps etched away leaving in this case a opening for the sample fluid. This opening is the channel field 360 and the tip channel 365 represented as the white spaces in FIGS. 6E and 6J respectively. The channel field 360 and the tip channel 365 occupy the volume where the PSG layer was located before the PSG layer is etched away.

Figure 6A:
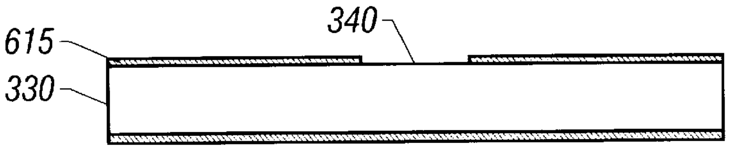
FIGS. 6A–6J shows the fabrication sequence.
Figure 6F:
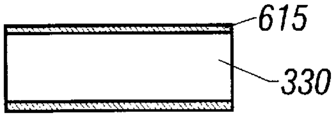

The fabrication sequence begins as shown in FIGS. 6A and 6F with a 1 μm deposition of LPCVD silicon nitride 615 on silicon substrate 330. The silicon nitride 615 is then patterned with $SF_6/O_2$ plasma. This step opens up inlet hole 340 to provide access to the channel field 360 after backside KOH etch.

Figure 6B:
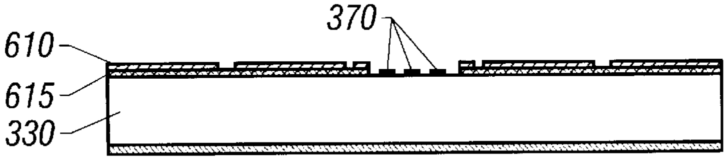
Figure 6G:
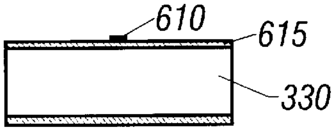

As shown in FIGS. 6B and 6G, after patterning the silicon nitride 615, a 1 μm layer of PSG 610 is deposited and patterned with buffered HF. The PSG acts as the sacrificial layer for the channel field 360 and the tip channel 365. The patterning of the rectangles 370 into the PSG 610 strengthens the inlet roof 630 as well as creating particle filter structures 370 inside the channel field 360. The inlet roof 630 is formed from the second silicon nitride layer 620.

Figure 6C:
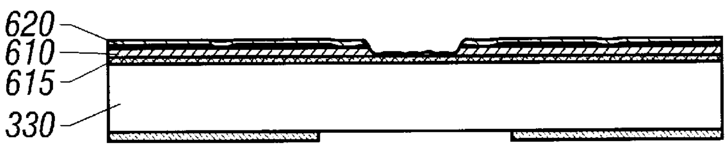
Figure 6H:
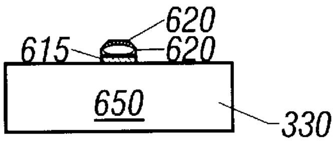

To complete the "sandwich," as shown in FIG. 6C and 6H, one more layer of 1 μm silicon nitride 620 is deposited and patterned. When this nitride layer 620 is deposited on PSG, the nitride layer 620 becomes the roof of the channel field 360 and the roof of the tip channel 365. In the areas 360, 365 where the PSG 610 has been etched, this second nitride 620 contacts the first nitride 615.

Figure 6D:
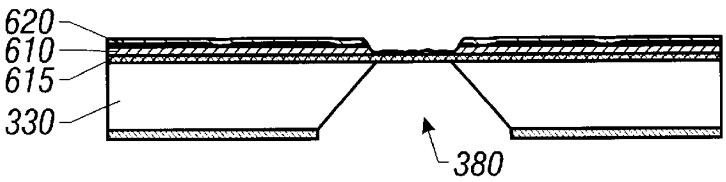
Figure 6I:
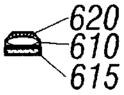

FIGS. 6D and 6I show backside windows being patterned into the wafer for a subsequent KOH bulk etching step. The bulk etching takes place from the front 650 and back side 380 simultaneously. In FIG. 6I, from the front side 650, the KOH etch removes the silicon 330 under the tip channel 365, thus defining the nozzle tip 390. In FIG. 6D, the back side 380 the wafer is etched until the nitride inlet holes 340 have been reached.

Figure 6E:
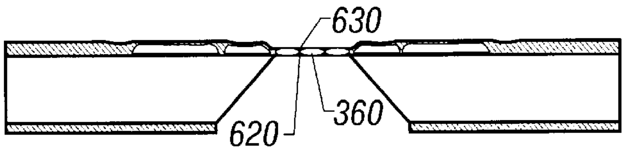
Figure 6J:

After rinsing the KOH, as shown in FIGS. 6E and 6J, the dies are etched for approximately 40 minutes in 49% HF to remove the sacrificial PSG 610 to release the channel structures 360, 365. The chips are subsequently rinsed in deionized water (DI) overnight and baked dry.

Figure 7:
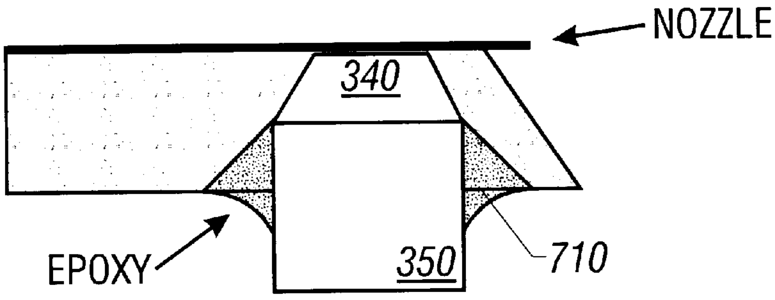
FIG. 7 shows a nozzle cross-sectional view.

One embodiment as shown in FIG. 7 has the connection 710 made by gluing a 700 μm OD fused silica capillary 350 to the underside of the sample inlet hole 340.

The layers that make up the roof and floor of the channel field 360 and tip channel 365 is preferably made from silicon nitride. Nitride is not etched by KOH, TMAH, HF and some other etchants which etch silicon and PSG. Any material that is not etched by etchants that can etch the support substrate and the sacrificial layer can be used.

The sacrificial layer is preferably made from PSG. Polysilicon can also be used. PSG is chosen because PSG is easily etched with HF and can be deposited conformably over nitride.

KOH is used in this embodiment as the bulk etchant. KOH is a standard etchant giving smooth sidewalls when etching silicon. KOH etching is also a very controllable and repeatable, robust process. The undercut of ill silicon planes is minimal when KOH is the etchant. Another etchant, ethylenediamine pyrocatehecol EDP can also be used. If polysilicon is used as the sacrificial layer instead of PSG, then TMAH can be used as the etchant.

The channel field 360 and the tip channel 365 can be derivitized hydrophobic or hydrophilic to accommodate the type of sample to be analyzed.

Performance Characterization

Tests were carried out to characterizes structural rigidity and channel blockage by injection of DI water into the inlet of fabricated electros;pray nozzles. Some nozzle clogging problems have been observed. Contamination from the sacrificial etch and crystallization of particles in the drying process is believed to be one cause of this clogging. This clogging problem is greatly reduced by a 24 hr or longer rinse in DI water, and a tip burn-in with an alcohol lamp. The liquid meniscus is monitored visually through a microscope as it traveled out to the tip. From video footage of this moving meniscus in the 2 μm channel, the inventors estimates a flow rate of 3.6 nL/min. Although the pressure drop of the fluid as it traveled through the nozzle channel is not measured, the reduction of the overall channel from about 200 μm to a micron size presents no significant back pressure when the channels is not clogged. The 1 μm channel height and particle filters ensures that no particulate matter is deposited at the nozzle tips from the sample fluid.

The pyramidal liquid port on the back of the micromachined chip is converted to a tubular configuration by the addition of a short section of 740 μm OD×530 μm ID Fused Silica Capillary (FSC) available from Polymicro Technologies, Phoenix, Ariz. The FSC extension is positioned within the liquid port using a crude micromanipulator with visual confirmation of joint alignment from a Leica×1000 stereo microscope. The extension was secured using a standard two-part epoxy resin. Once cured, the extension was cut to a final length of one centimeter. Liquid connection to the chip interface is achieved using a multi-laminate fused silica transfer line constructed as follows. The running length of transfer line (10–15 cm) is constructed from 150 μm OD×25 μm ID FSC. Each end of the transfer line was inserted into a 2–3 cm section of 350 μm OD×155 μm ID FSC until flush and then sealed with epoxy resin. Upon drying, one end of the transfer line is inserted into the 530 μm ID FSC extension and sealed in the same manner.

Chip performance is analyzed using a standardized solution of Gramicidin S. The test sample is dissolved in 50:50 MeOH:Water, 1% HOAc (by volume) at a final concentration of 4 pmole/μl. A Harvard Apparatus model 44 syringe pump fitted with a 50 ul gas-tight syringe available from Hamilton, Reno, Nev., is used to deliver the test compound to the M-M interface via a separate 75 cm length of 350 μm OD×75 μm ID FSC transfer line. A 2.5 cm section of 22 gauge Platinum tubing available from Hamilton, is fitted to the end of the transfer line to provide the necessary liquid-metal contact for sample ionization. Final connection to the M-M transfer line is through a Supelco Capillary Butt connector using a 0.4 mm to 0.8 mm ID dual sided Vespel ferrule available from Supelco Inc., Bellafonte, Pa.

The standard ESI interface to the Finnigan Mat LCQ Ion Trap mass spectrometer is replaced with a Polyacrylic platform upon which a XYZ micropositioning translational stage, e.g. model 460A XYZ, available from Newport Corp., Newport Beach, Calif., had been mounted. The nozzle chip is secured to the XYZ stage using a modified micro clamp, e.g. a clothes pin, and precisely positioned under a high-power stereomicroscope, e.g., Zeiss, STEMI SV8, 200 mm lens, 25× ocular. A fiber optic cold light source available from Schott, model KL1500, was used for illumination. The high voltage lead from the mass spectrometer was modified to terminate in a small alligator clamp to facilitate the connection to the Platinum electrode. The nozzle was centered in front of the heated capillary inlet of the mass spectrometer at a cistance of 0.25 mm to 0.4 mm.

The Finnigan Mat LCQ Ion Trap mass spectrometer is operated under manual control through the "Tune Plus" view over a scan range from 500 to 1200 AMU. The maximum injection time is 500 ms with an AQC setting of 1.0×10 8 for full mass range analysis. A 4 kV potential is applied to the Platinum electrode for sample ionization.

Figure 8:
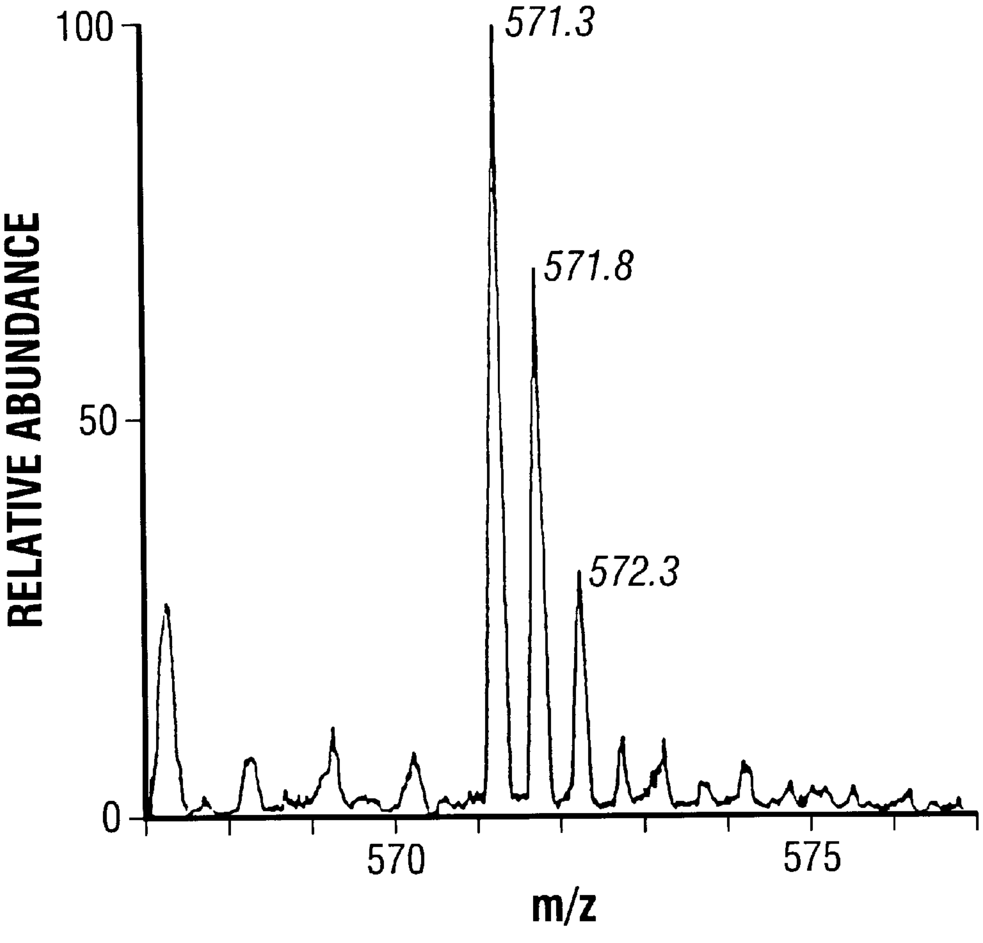
FIG. 8 shows a mass spectrum analysis of gramicidin S.

FIG. 8 shows a mass spectrum analysis of gramicidin S. The group of doubly charged ions (m/z ratios 571.3–572.3) characteristic of gramicidin S have been clearly detected above the background ions. The additional peaks in the spectrum seem to have come from epoxy residue. Although epoxy contamination remains an important issue when the nozzle is used by itself, on-chip integration with other separation devices may eliminate this problem. The sensitivity of this MS analysis is comparable to that of conventional ESI sources.

This nozzle can be used for nano-flow electrospray. The use of micromachining also adds a level of repeatability in the nozzle tip that is unavailable with conventional tips. Furthermore, the integration of micro-particle filters has made the nozzle a much more convenient tool for MS. This MEMS device now has the possibility to be integrated with other chip-based chemical analysis systems, thus, increasing the potential of high sensitivity chemical detection with MEMS systems.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A method of fabricating a micromachined electrospray nozzle with a micro-channel, comprising:

obtaining a support substrate;

first forming a first layer on said support substrate forming a floor of a micro-channel;

first patterning said first layer forming an inlet hole;

second forming an interior layer over said first layer, said interior layer occupying a portion of a volume of said micro-channel but still allow fluid to flow;

second patterning a portion of said interior layer to form a filter structure;

third forming a second layer, said second layer forming a roof of said micro-channel, thereby defining said micro-channel with supporting sides and said interior layer inside said supporting sides; and first etching said support substrate to expose a nozzle tip and releasing said inlet hole.

2. A method as in claim 1, wherein said support substrate is silicon.

3. A method as in claim 2, wherein said first etching is done with Potassium hydroxide.

4. A method as in claim 2, wherein said first etching is done with ethylenediamine pyrocatehecol (EDP).

5. A method as in claim 1, wherein said first layer contains nitride.

6. A method as in claim 1, wherein said interior layer is phosphosilicate glass (PSG).

7. A method as in claim 4, further comprising a second etching which is done with hydrogen fluoride.

8. A method as in claim 1, wherein said second forming comprises depositing a sacrificial layer, and etching said sacrificial layer to allow fluid flow therethrough.

9. A method as in claim 1, wherein said first and second layers are a material that is not etched by etchants that etch the sacrificial layer.

10. A method as in claim 1, wherein said interior layer is polysilicon.

11. A method as in claim 10, further comprising a second etching which is done with tetramethyl ammonium hydroxide (TMAH).

12. A method as in claim 1, wherein said first patterning is done with $SF_6/O_2$.

13. A method of fabricating a micromachined electrospray nozzle, comprising:

first forming a channel field that defines a micro-channel;

second forming a tip in communication with said micro-channel, said channel field narrower at an end near the tip than at an end distant from the tip;

third forming a filter structure on said channel field, said filter structure having multiple spaced filter structures; and spacing said filter structures such that said filter structures are closer together on the channel field as the channel field narrows into said tip.

14. A micromachined channel apparatus, comprising:

a support substrate;

a nozzle structure formed on said support substrate;

a sample inlet hole formed on said nozzle structure;

a capillary tube feeding a sample into said nozzle structure via said inlet hole, said capillary tube having an inner diameter between 0.3–3 μm.

15. A micromachined nozzle comprising:

a channel field having an inner diameter between 0.3–3 μm;

a nozzle tip, wherein said channel field is a micro-channel that narrows into a channel of said nozzle tip, wherein said nozzle tip functions as a sample outlet;

a filter structure positioned on said channel field, said filter structure having multiple spaced filter elements, wherein said filter elements are positioned such that said filter elements are closer together on the channel field as the channel field narrows into said tip;

an inlet hole positioned on said channel field, said inlet hole functions to allow a sample to enter said channel field.

16. A nozzle as in claim 15, wherein said sample outlet is an interface with Et mass spectrometer.

17. A nozzle as in claim 15, wherein said channel field and said tip are derivitized hydrophobic or hydrophilic to accommodate said sample.

* * * * *

UNITED STATES PATENT AND TRADEMARK OFFICE
CERTIFICATE OF CORRECTION

PATENT NO. : 5,994,696
DATED : NOVEMBER 30, 1999
INVENTOR(S) : YU-CHONG TAI ET AL.

It is certified that error appears in the above-identified patent and that said Letters Patent is hereby corrected as shown below:

In Column 1, before FIELD OF INVENTION, insert the following:

-- STATEMENT AS TO FEDERALLY-SPONSORED RESEARCH

U.S. Government may have certain rights in this invention pursuant to Depart of Army, grant no. DAAD05-96-P-4101.--

On the front page [73] Assignee, please add -- City of Hope, California -- after California Institute of Technology, Pasadena, CA.

Signed and Sealed this

Eighth Day of May, 2001

Attest:

NICHOLAS P. GODICI

*Attesting Officer*

*Acting Director of the United States Patent and Trademark Office*